US00RE44843E

(19) United States
(12) Reissued Patent
Kinderman

(10) Patent Number: US RE44,843 E
(45) Date of Reissued Patent: Apr. 15, 2014

(54) LIGHT SET ARRANGEMENT

(75) Inventors: Abraham S. Kinderman, Gladwyne, PA (US); Judith Kinderman, legal representative, Gladwyne, PA (US)

(73) Assignee: J. Kinderman & Sons, Inc., Philadelphia, PA (US)

(21) Appl. No.: 13/463,896

(22) Filed: May 4, 2012

Related U.S. Patent Documents

Reissue of:
(64) Patent No.: 6,179,647
Issued: Jan. 30, 2001
Appl. No.: 09/245,433
Filed: Feb. 5, 1999

U.S. Applications:
(60) Provisional application No. 60/106,125, filed on Oct. 29, 1998.

(51) Int. Cl.
*H01R 13/58* (2006.01)

(52) U.S. Cl.
USPC ..... 439/470; 362/396

(58) Field of Classification Search
USPC ..... 362/249.15–249.16, 391, 226, 249, 362/252, 291, 396, 806; 439/470, 449, 457, 439/575, 699.2
See application file for complete search history.

(56) References Cited

U.S. PATENT DOCUMENTS

| | | | |
|---|---|---|---|
| 910,158 | A | 1/1909 | Walker |
| 1,025,964 | A | 5/1912 | Costuma |
| 1,501,807 | A | 7/1924 | Petschel |
| 2,346,276 | A | 4/1944 | Reittinger |

(Continued)

*Primary Examiner* — Calvin Lee

(74) *Attorney, Agent, or Firm* — Panitch Schwarze Belisario & Nadel LLP

(57) ABSTRACT

[In a first aspect of the invention, a light set arrangement is provided. The] *A* light set arrangement includes a *plurality of electrical wire segments feeding and downwardly dangling from a feeder electrical wire to simulate icicles. Each of a* plurality of decorative lights and connectors[, each decorative light and connector extending] *connected to the downwardly dangling electrical wire segments has a longitudinal axis and extends* along a longitudinal axis *formed by at least one electrical wire associated with the plurality of electrical wire segments*. At least one electrical wire connects the plurality of decorative lights to each other. [The arrangement also includes a] *Each of a* plurality of retaining members [wherein each retaining member] retains the electrical wire connected to the decorative light and connector so that the longitudinal axis of each decorative light and connector is generally parallel to the electrical wire *without being connected to or supported by any additional support structure*.

[In a second aspect, a light connector is provided including a light bulb holder adapted for holding a light bulb, and a socket body. The socket body has a longitudinal axis, an outer surface and an opening to receive the light bulb holder. The socket body has an interior region with opposing electrical contacts adapted to receive electrical wires and make an electrical connection between the electrical wires and a light bulb. At least one projection extends from the outer surface of the socket body in a direction generally perpendicular to the longitudinal axis of the socket body. The projection has a distal end terminating in at least one clip. The clip has a rounded throat with rounded edges forming a space within which at least one electrical wire is adapted to be disposed and a lip associated with the throat, the lip having rounded edges and extending into the space. The lip is adapted to retain the electrical wire in place and to maintain the longitudinal axis of the socket body in a direction generally parallel to the electrical wire.]

12 Claims, 3 Drawing Sheets

(56) References Cited

U.S. PATENT DOCUMENTS

| | | | | | |
|---|---|---|---|---|---|
| 2,488,326 | A | | 11/1949 | Pratt | |
| D159,261 | S | | 7/1950 | Fiechter | |
| 2,565,719 | A | | 8/1951 | Church | |
| 3,181,827 | A | | 5/1965 | Sassin | |
| D209,517 | S | | 12/1967 | Burnbaum | |
| 3,578,282 | A | | 5/1971 | Olsen | |
| 3,630,475 | A | | 12/1971 | Barry | |
| 3,861,632 | A | | 1/1975 | Siilats | |
| 3,891,176 | A | | 6/1975 | Downing et al. | |
| D287,769 | S | * | 1/1987 | Davis | D26/25 |
| 4,802,072 | A | | 1/1989 | Kau | |
| 4,852,832 | A | | 8/1989 | Delaney | |
| 4,880,133 | A | | 11/1989 | Cullinane | |
| 4,979,712 | A | | 12/1990 | Rios | |
| D318,608 | S | | 7/1991 | Schenker | |
| D322,361 | S | | 12/1991 | Goodman et al. | |
| 5,141,192 | A | | 8/1992 | Adams | |
| 5,150,964 | A | | 9/1992 | Tsui | |
| D331,360 | S | | 12/1992 | Adams | |
| 5,379,202 | A | * | 1/1995 | Daun | 362/249.16 |
| D356,246 | S | | 3/1995 | Adams | |
| D356,492 | S | | 3/1995 | Adams | |
| 5,496,005 | A | | 3/1996 | Dieringer | |
| 5,566,058 | A | | 10/1996 | Protz, Jr. | |
| 5,607,131 | A | | 3/1997 | Adams | |
| D383,226 | S | | 9/1997 | Odierna | |
| 5,669,709 | A | | 9/1997 | Adams | |
| D386,445 | S | * | 11/1997 | Odierna | D11/121 |
| 5,700,083 | A | | 12/1997 | Boechel | |
| 5,791,765 | A | | 8/1998 | Lin | |
| 5,860,731 | A | * | 1/1999 | Martinez | 362/249.16 |
| 5,908,238 | A | * | 6/1999 | Huang | 362/391 |
| 5,915,826 | A | | 6/1999 | Lin | |
| 6,048,077 | A | * | 4/2000 | Pan | 362/249.15 |
| 6,179,647 | B1 | * | 1/2001 | Kinderman | 439/470 |

* cited by examiner

LIGHT SET ARRANGEMENT

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority from Provisional Application No. 60/106,125, filed on Oct. 29, 1998.

BACKGROUND OF THE INVENTION

The present invention relates to a light set arrangement simulating lighted icicles. In this invention, the lights are arranged on downwardly dangling wires to simulate icicles where the lights are generally parallel to the wires. One such arrangement employs improved light connectors with retaining clips designed to reduce damage to the insulation surrounding the electrical wires.

Christmas lights, as well as other decorative lights, have gained increasing popularity in recent years. Such lights are used as indoor and outdoor decorations, and are typically provided as assemblies having electrical wires or segments thereof to which light sockets and bulbs are attached. These assemblies are placed on building structures, trees, or other forms to provide lighted shapes particularly in the shape of icicles.

In the past, simulated icicles formed from electrical wires with light bulbs attached failed to fully reflect the linearity of an icicle. This was because the light bulbs and sockets were spaced along the electrical wires at intervals but were haphazardly attached to the wires so that the bulbs were displayed in a random arrangement with respect to the electrical wires and generally not parallel to the wires. Typically, the bulbs were displayed on opposite sides of or extending at angles from the wires. This problem was further exacerbated by the failure of the sockets holding the light bulbs to be attached to the electrical wires so that they remain fixed and generally parallel to the wires. Often the light sockets and attached electrical wires were twisted and bent around straight-edged clips causing abrasion and other damage to the insulation surrounding the electrical wires.

There is a need for a light set arrangement and light set connectors that provide a fixed arrangement of lights to more realistically or linearly simulate icicles. There is also a need for a light socket arrangement that reduces damage to the insulation of the electrical wires. The present invention satisfies these needs.

BRIEF SUMMARY OF THE INVENTION

In a first aspect of the invention, a light set arrangement is provided. The light set arrangement includes a plurality of decorative lights and connectors, each decorative light and connector extending along a longitudinal axis. At least one electrical wire connects the plurality of decorative lights to each other. The arrangement also includes a plurality of retaining members wherein each retaining member retains the electrical wire connected to the decorative light and connector so that the longitudinal axis of each decorative light and connector is generally parallel to the electrical wire.

In a second aspect, a light connector is provided including a light bulb holder adapted for holding a light bulb, and a socket body. The socket body has a longitudinal axis, an outer surface and an opening to receive the light bulb holder. The socket body has an interior region with opposing electrical contacts adapted to receive electrical wires and make an electrical connection between the electrical wires and a light bulb. At least one projection extends from the outer surface of the socket body in a direction generally perpendicular to the longitudinal axis of the socket body. The projection has a distal end terminating in at least one clip. The clip has a rounded throat with rounded edges forming a space within which at least one electrical wire is adapted to be disposed and a lip associated with the throat, the lip having rounded edges and extending into the space. The lip is adapted to retain the electrical wire in place and to maintain the longitudinal axis of the socket body in a direction generally parallel to the electrical wire.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
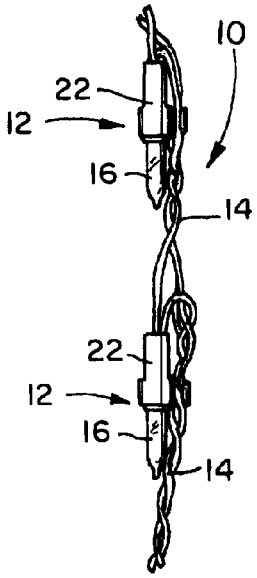
FIG. 1 is a partial view of the decorative light bulb and socket arrangement in accordance with the present invention.

Certain terminology is used in the following description for convenience only and is not limiting. The words "lower," "upper," "left," and "right" designate directions in the drawing to which reference is made. The terminology includes words above specifically mentioned, derivatives thereof, and words of similar import.

As used herein, unless otherwise indicated, the article "a" means one or at least one of the element(s) to which it refers.

Figure 9:
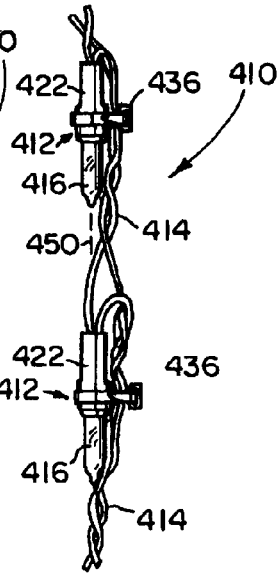
FIG. 9 is a partial view of a fifth embodiment of the decorative light bulb and socket arrangement in accordance with the present invention.
Figure 10:
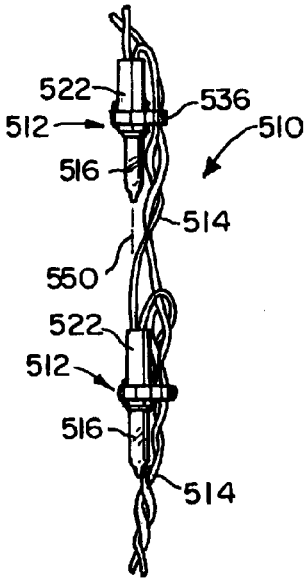
FIG. 10 is a partial view of a sixth embodiment of the decorative light bulb and socket arrangement in accordance with the present invention.
Figure 11:
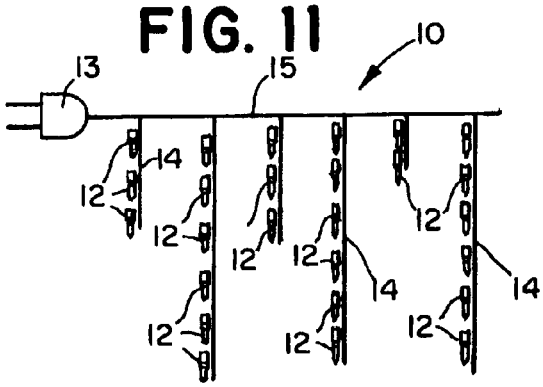
FIG. 11 is a schematic representation of a full assembly showing the light bulb and socket arrangement in accordance with the present invention.
Figure 2:
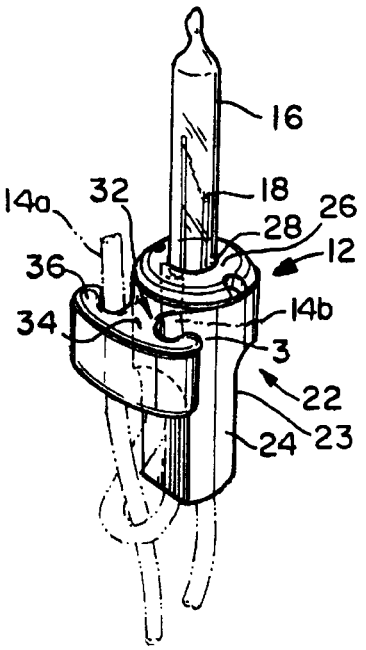
FIG. 2 is a perspective view of a first embodiment of a light bulb socket with fastening clips in accordance with the present invention.

Referring now to the drawings in detail, wherein like numerals are used to indicate like elements throughout, there is shown in FIGS. 1-11, preferred embodiments of the light socket arrangement, generally designated 10, in accordance with the present invention. As shown in FIGS. 1 and 11, the arrangement 10 is comprised of a plurality of decorative lights 12 connected to one another by an electrical wire 14 or segments of electrical wire 14. The decorative lights 12 are disposed in generally parallel relationship to the electrical wires 14. Referring to FIG. 2, each decorative light 12 includes a light bulb 16 with at least one filament 18 disposed within the light bulb. The light 12 is further provided with a bulb holder 26 at the lower region of the bulb which fits within the connector 22. The plurality of decorative lights 12 including bulbs 16 and connectors 22 are located or arranged in a generally parallel relationship to the electrical wires 14 so as to simulate an icicle. Alternatively, the decorative light arrangement having light bulbs 16 in a generally parallel relation to the electrical wires 14 may be formed into other shapes requiring the simulation of a straight line, or other arrangement where the bulbs are desirably generally parallel to the wires, such as the outline of a particular shape, including but not limited to a star, and other holiday figures and characters.

The decorative lights 12 used in any of the embodiments described herein are generally of the type referred to as minilights of varying construction well known to those skilled in the art. The light bulbs 16 may be of any color and may be the type that illuminate continuously or the type that blink on and off, both of which are commercially available.

The electrical wires 14 of the lighting arrangement are ultimately terminated at a plug connector 13 (see FIG. 11) for insertion into a source of electric power such as a wall outlet (not shown). When the plug is connected into the wall outlet, current goes through the electrical wires 14 to light the light bulbs 16. As shown in FIG. 11, a plurality of wires 14 in the form of segments of varying length feed from a common or feeder electrical wire 15 that is electrically and mechanically connected to the plug connector 13.

Figure 3:
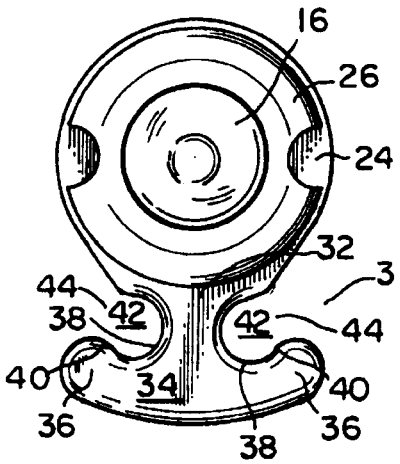
FIG. 3 is a top plan view of FIG. 2.

Referring to FIGS. 2 and 3, the connector 22 includes a socket body 24 and a bulb holder 26, having an opening 28 to receive the base of the light bulb 16. The bulb holder 26 and socket body 24 are generally cylindrical. The socket body 24 has flat portions 23 to aid a person holding the light 12. An opening (not shown) is provided at the bottom (in the orientation shown in FIGS. 2 and 3) of the socket body 24 through which the electrical wires 14 enter the connector 22. Within the socket body 24 is an interior region having electrical contacts (not shown) typically of copper or other conductive metal, to which the electrical wires 14 are electrically connected. The filaments 18 extending from the light bulb 16 are also electrically connected to the metal contacts within the socket 22 by a friction fit between the socket body 24 and the bulb holder 26.

Referring again to FIGS. 2 and 3, there is shown a projection 32 projecting from the socket body 24. The distal end 34 of the projection 32 terminates into a pair of retaining clips 36 in the shape of hooks. Referring to FIG. 3, the retaining clips 36 include a throat 38, which is preferably but not necessarily rounded, forming a space or gap 42 within which an electrical wire 14 is disposed. Each retaining clip 36 is further provided with a lip 40 at the end of the throat 38 that serves to hold the wire 14 in place within the clip 36. Each clip 36 also has an opening 44 through which the electrical wire 14 is introduced into the gap 42.

In the embodiment shown in FIGS. 2 and 3, each of the throats 38 is facing in a direction opposite to one another so that the respective openings 44 are likewise facing in opposite directions. In use, the electrical wires 14a, b are disposed within the spaces 42 of the clips 36 so that the electrical wires 14a, b are retained in a generally parallel arrangement to each other (as shown in phantom in FIG. 2) as well as to the decorative light 12.

The socket body 24, projection 32, and retaining clips 36 of connectors 22 preferably, but not necessarily, form a unitary structure made from a polymeric plastic that is molded or cast to create durable and weather resistant connectors. Suitable plastics include but are not limited to polypropylene, polyvinyl chloride (PVC), or polycarbonate. The electrical wires 14 are insulated by conventional polymeric insulating materials so that they are suitable for use in all weather conditions, including wet and freezing conditions. In addition, the insulation on the wires 14 is resistant to the heat generated by the light bulb 16 even though the bulb is in close proximity to the wire insulation.

Referring again to FIG. 3, the retaining clips 36 of the connectors 22 are shown to have preferred throats 38 and lips 40 with rounded edges to prevent or reduce any damage to the insulation around the wires due to abrasion or rubbing of the wires within the retaining clips 36.

Figure 4:
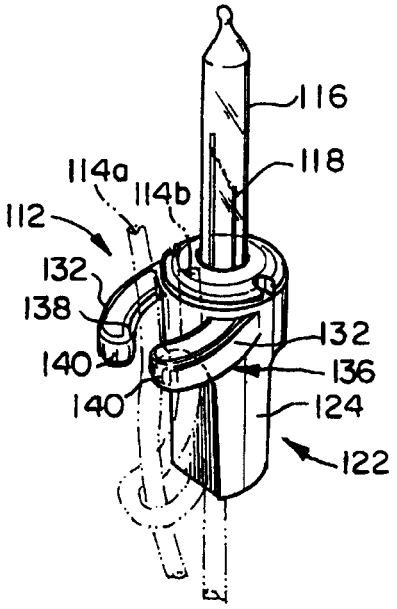
FIG. 4 is a perspective view of a second embodiment of the light bulb socket with fastening clips.
Figure 5:
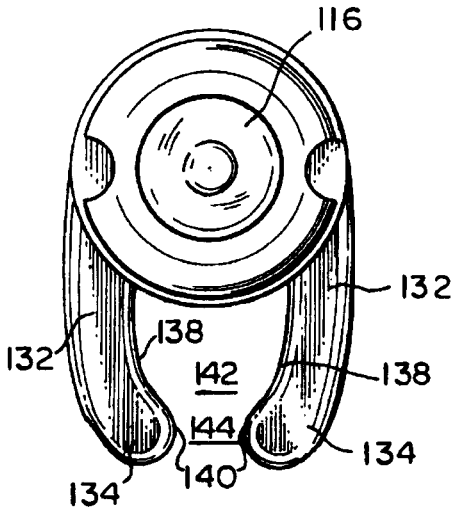
FIG. 5 is a top plan view of the embodiment shown in FIG. 4.

Referring to FIGS. 4 and 5, a second embodiment of the decorative lights 112 is shown. The decorative lights 112 are similar to the decorative lights 12 of the first embodiment and like elements have been identified with the same reference numbers except the prefix of "1" has been added. For example, the connector 122 of the light 112 of the second embodiment is similar to the connector 22 of the light 12 of the first embodiment.

With respect to connector 122, and as shown in FIGS. 4 and 5, a pair of projections 132 extend from the side of a socket body 124 to form a retaining clip 136. The projections 132 are slightly curved generally inwardly and terminate in generally rounded distal ends 134 thereby forming throats 138 and lips 140 at the distal ends 134 of the projections 132. Referring to FIG. 5, a space or gap 142 is formed between the pair of projections 132 in which the electrical wires 114a, b are disposed. An opening 144 is located between the edges of the lips 140, 141 through which the electrical wires 114a, b are introduced to the gap 142. Similar to the first embodiment, the throats 138 and lips 140 are provided with rounded edges to prevent or reduce damage to the insulation of any wires held within the retaining clip 136.

Figure 6:
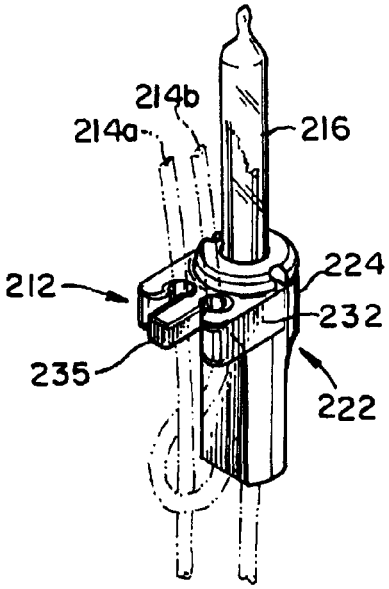
FIG. 6 is a perspective view of a third embodiment of the light bulb socket with fastening clips.
Figure 7:
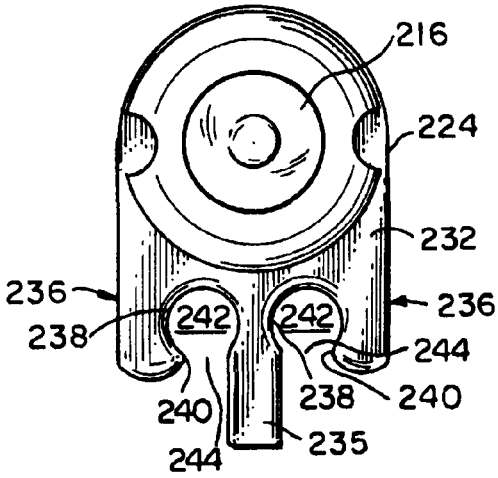
FIG. 7 is a top plan view of the embodiment shown in FIG. 6.

Referring to FIGS. 6 and 7, a third embodiment of decorative lights 212 is shown. The decorative lights 212 are similar to the decorative lights 12 and 112 of the first two embodiments, and like elements have been identified with the same reference number except the prefix "2" has been added.

With respect to connector 222, as shown in FIGS. 6 and 7, a projection 232 extends from the socket body 224. The projection 232 terminates in a pair of retaining clips 236 that are located on opposite sides of a central projection 235 extending from the socket body 234. Referring to FIG. 7, each of the retaining clips 236 includes a rounded throat 238 and a lip 240 at one end of the throat 238 and a portion of the central projection 235 forming a gap or space 242 within which the wire 214a or 214b is positioned. An opening 244 is also provided to each of the retaining clips 236, and is formed between lip 240 and the central projection 235 of each clip. The embodiment of FIGS. 6 and 7 shows the retaining clips 236 are arranged so that the openings 244 of each clip 236 face outward and are parallel to each other. The gaps or spaces 242 are generally central to each of the retaining clips 236 for disposition of the electrical wires 214a,b.

Similar to the previously described embodiments, the throats 238 and lips 240 and edges of the intermediate portion 235 are rounded to prevent or reduce damage to the insulation of the electrical wires 214.

Also similar to the previously described embodiments, the light bulbs 216 held by the connectors 222 are in a generally parallel arrangement with respect to the electrical wires 214.

Alternatively, but not shown, connectors having a single retaining clip including a throat and lip to retain a single electrical wire are also suitable to create the lighting arrangement wherein the light bulbs are held via the retaining clip to be generally parallel with respect to the electrical wire.

Figure 8:
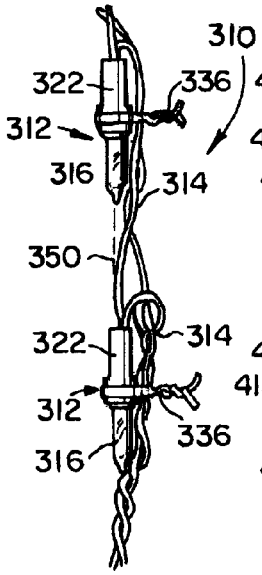
FIG. 8 is a partial view of a fourth embodiment of the decorative light bulb and socket arrangement in accordance with the present arrangement.

FIG. 8 shows a lighting arrangement 310 of decorative lights 312 held in generally parallel arrangement to the electrical wires 314. The light bulbs 316 are retained by and electrically connected to conventional connectors 322 that have no retaining mechanisms and are molded or otherwise unitarily formed. In this embodiment, the light bulbs 316 and connectors 322 are retained in position so that the longitudinal axis 350 of the bulb 316 and connector 322 is generally parallel to that of the electrical wire 314 by twist wraps 336. Each of the twist wraps 336 is commercially available and generally constructed of a thin metal wire that retains its shape when bent or twisted, such as an annealed metal, which is coated with heat resistant polymeric material in laminar relation. The coated wire 336 wraps around the connector 322 and the electrical wire 314 to which the connector 322 is electrically connected. The ends of the twist wrap 336 are twisted together to hold the connector 322 and wire 314 in place.

Alternatively, and as shown in FIG. 9, a cable tie 436 is used to hold the decorative lights 412, each comprising a bulb 416 and a connector 422, parallel to the electrical wire 414. A cable tie 436 is a thin plastic strip having an opening at one end with an element to engage serrations or angled saw teeth formed in the opposing end. Cable ties are well known and are readily commercially available. The cable tie 436 is wrapped around the connector 422 and electrical wire 414 so that the longitudinal axis 450 of the light 412 is generally parallel to the electrical wires 414.

It is understood by those of ordinary skill in the art that the present invention is not limited to the bulbs being disposed parallel to the wires by any of the specifically identified connecting mechanisms and that other mechanisms to hold the bulbs parallel to the electrical wires could also be used. Bulb holders such as plastic bands, including those of a heat shrinkable material or bands of elastomeric material, could be used to hold the light bulbs parallel to the electrical wires. Similarly, electrical adhesive tape could also be used for the same purposes to maintain the position of decorative lights in a generally parallel arrangement with respect to the electrical wire. These alternative embodiments are illustrated in FIG. 10, where the plastic or elastomeric bands or tape are all schematically represented by numeral 536 and are used to maintain the position of the decorative lights 512 in a generally parallel arrangement with respect to the electrical wire 514.

It will be appreciated by those skilled in the art in view of the present disclosure that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A light set arrangement comprising:

*a plurality of electrical wire segments feeding and downwardly dangling freely from a feeder electrical wire to simulate icicles, the feeder electrical wire being electrically connectable to a source of electricity for the light set arrangement;* a plurality of decorative lights and connectors for the decorative lights *connected to the plurality of the downwardly dangling electrical wire segments*, each decorative light and connector *having a longitudinal axis and* extending along a longitudinal axis formed by at least one electrical wire *associated with the plurality of electrical wire segments, the at least one electric wire* connecting the plurality of decorative lights and connectors to each other; and a plurality of retaining members, wherein each retaining member [is] *comprises a projection and is* connected only to a connector and to the electrical wire *without being connected to or supported by any additional support structure* in a manner whereby the retaining member retains the electrical wire connected to the connector such that the longitudinal axis of each decorative light and connector is generally parallel to the longitudinal axis of the electrical wire,

*the connector comprising a socket body with an outer surface and including a light bulb producing the decorative light, the projection extending from the outer surface of the socket body in a direction generally perpendicular to the longitudinal axis of the connector, the outer surface of the socket body including a portion extending generally parallel to the longitudinal axis of the connector adjacent the projection.*

[2. A light set arrangement according to claim 1 wherein the retaining member is selected from the group consisting of a clip projecting from the connector, a twist wrap, a cable tie, a plastic band, an elastomeric band and adhesive tape.]

[3. A light set arrangement according to claim 1 wherein the retaining member extends from the connector.]

4. A light set arrangement according to claim [3 wherein the connector includes a socket body, the retaining member is at least one projection extending from the socket body.] *1,* the projection having a distal end terminating in at least one clip, the clip having a throat forming a space within which at least one electrical wire is disposed and a lip associated with the throat extending into the space to retain the electrical wire within the space.

5. A light set arrangement according to claim [3 wherein the connector includes a socket body,] *1,* the retaining member [is] *comprising* at least one projection extending from the socket body *in a direction generally perpendicular to the longitudinal axis of the connector*, each projection having a distal end terminating in two clips, each of the clips having a throat and a lip wherein each clip has an opening adjacent the lip for introduction of electrical wires into a space formed by the throat and wherein the openings of each clip are oriented in generally opposed directions.

6. A light set arrangement according to claim [3 wherein the connector includes a socket body, the retaining member is a projection extending from the socket body,] *1,* the projection terminating in two clips, each of the clips having a throat and a lip wherein each clip has an opening adjacent the lip for introduction of the electrical wires into a space formed by the throat and wherein the openings of each clip are generally oriented in the same direction such that the openings of each clip are generally parallel to each other.

7. A light set arrangement according to claim [3 wherein the connector includes a socket body,] *1,* the retaining member [includes] *including* two projections forming a retaining clip, each projection extending from the outer surface of the socket body in a direction generally perpendicular to the longitudinal axis of the [socket body] *connector*, each projection having a distal end having a throat and a lip associated with the throat to retain the electrical wire, wherein the projections are oriented such that the throat and lip of each projection face one another and form an opening and space between the lips for disposition of the electrical wires.

[8. A light connector comprising:

a light bulb holder adapted for holding a light bulb;

a socket body having a longitudinal axis, the socket body having an outer surface, an opening to receive the light bulb holder, an interior region with opposing electrical contacts adapted to receive electrical wires and make an electrical connection between the electrical wires and a light bulb; and at least one projection extending from the outer surface of the socket body in a direction generally perpendicular to the longitudinal axis of the socket body, the projection having a distal end terminating in at least one clip, the clip having a throat with rounded edges forming a space within which at least one electrical wire is adapted to be disposed and a lip associated with the throat, the lip having rounded edges and extending into the space and adapted to retain the electrical wire in place and adapted to maintain the longitudinal axis of the socket body in a direction generally parallel to the electrical wire.]

[9. A light connector according to claim 8 wherein the projection of the socket body has a distal end terminating in two clips, each of the clips having a throat and lip wherein each clip has an opening adjacent the lip adapted for introduction of electrical wires into a space formed by the throat and wherein the openings of each clip are oriented in generally opposed directions.]

[10. A light connector according to claim 8 wherein the projection of the socket body has a distal end terminating in two clips, each of the clips having a throat and a lip wherein each clip has an opening adjacent the lip adapted for introduction of electrical wires into a space formed by the throat and wherein the openings of each clip are oriented generally in the same direction such that the openings of each clip are generally parallel to each other.]

[11. A light connector according to claim 8 having two projections forming a retaining clip, each projection extending from the outer surface of the socket body in a direction generally perpendicular to the longitudinal axis of the socket body, each projection having a distal end having a throat and a lip associated with the throat, wherein each of the projections is oriented such that the throat and lip of each projection face one another thereby forming an opening and space between the lips adapted for introduction and disposition of electrical wires.]

[12. A light connector according to claim 8 wherein the projection and socket body are unitary and formed from the same material.]

13. The light set arrangement according to claim 1 wherein the light set arrangement simulates at least one lighted icicle.

*14. The light set arrangement according to claim 1 wherein the downwardly dangling electrical wire segments extend generally perpendicularly from the feeder electrical wire.*

*15. The light set arrangement according to claim 1 wherein the plurality of the electrical wire segments have varying lengths.*

*16. The light set arrangement according to claim 1 wherein each of the plurality of electrical wire segments is associated with at least two of the plurality of decorative lights.*

*17. The light set arrangement according to claim 1 wherein the connector includes a socket body, the socket body including a flat portion.*

*18. The light set arrangement according to claim 17 wherein the flat portion extends generally parallel to the longitudinal axis adjacent the retaining members.*

*19. The light set arrangement according to claim 1 wherein the socket body includes a first end and an opposed second end, the light bulb being within the socket body at the first end and electrical wires entering the socket body at the second end.*

* * * * *